(No Model.)
J. J. OSBURN.
CORN HARVESTER.
No. 532,392. Patented Jan. 8, 1895.
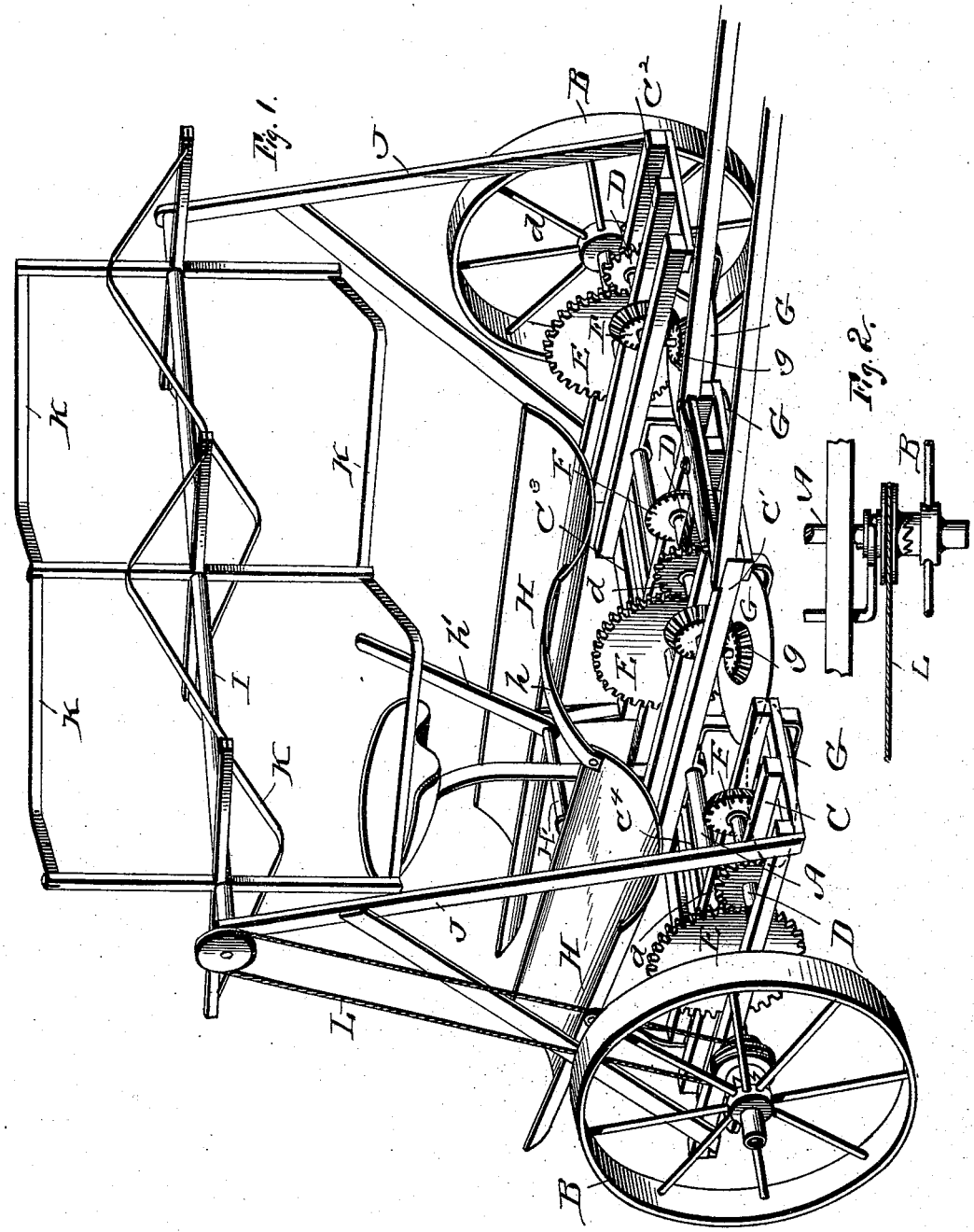
Witnesses
Inventor
John J. Osburn.
by R. S. & A. P. Lacey
Attorneys

UNITED STATES PATENT OFFICE.

JOHN JESSE OSBURN, OF MOUNT PLEASANT, OHIO.

CORN-HARVESTER.

SPECIFICATION forming part of Letters Patent No. 532,392, dated January 8, 1895.

Application filed February 6, 1894. Serial No. 499,292. (No model.)

*To all whom it may concern:*

Be it known that I, JOHN JESSE OSBURN, a citizen of the United States, residing at Mount Pleasant, in the county of Jefferson, State of Ohio, have invented certain new and useful Improvements in Corn-Harvesters; and I do hereby declare the following to be a full, clear, and exact description of the invention, such as will enable others skilled in the art to which it appertains to make and use the same.

This invention relates to corn harvesting machinery designed to be drawn over the field and cut two or more rows of corn at the same time.

The improvement consists of the novel features and the peculiar construction and combination of the parts which will be hereinafter more fully described and claimed and which are shown in the annexed drawings, in which—

Figure 1 is a perspective view of a corn harvester embodying my invention. Fig. 2 is a detail view of the ratchet or truss mechanism for throwing the wheels in and out of gear with the axle.

The axle A is designed to rotate and impart motion to the several rotary cutters in the manner hereinafter more particularly referred to and is provided at its ends with wheels B mounted to turn loosely thereon and provided with the usual ratchet or clutch mechanism whereby the said wheels and axle are caused to revolve together in the well known manner. A series of frames C, C', C² are located upon the axle and are connected together at their rear ends by a beam C³ and bars C⁴. These frames project forwardly from the axle and carry the cutting blades and their actuating mechanism. Short shafts D mounted in the forward end of the frames parallel with the axle have pinions $d$ which mesh with gear wheels E keyed on the said axle A. Bevel gear wheels F secured on the shafts D mesh with corresponding bevel gear wheels $g$ attached to the rotary cutters G which latter are disposed to revolve in a horizontal plane, or in an oblique plane if desired, the inner edge portions of a pair of said rotary cutters being arranged to overlap to insure a perfect cut of the stalks. The rotary cutters are arranged in pairs, each pair being disposed to operate in the space provided between the end frames C, C² and the middle frame C', as shown.

A tilting receiver or carrier H is located immediately in the rear of each pair of cutters and is trough shaped and slightly tapering in length, being wider at the front or receiving end. These receivers or carriers H are secured to a shaft H', which forms the axis of the receivers, and upon which they turn, and these receivers are also connected in series by a strap $h$ so they can be simultaneously operated to deposit the corn at the required point. These receivers or carriers are under the control of the driver and can be operated either by foot or hand, the foot being engaged with the strap $h$ to hold the carriers in operative position to receive the corn and dump the load when required. The lever $h'$ is provided when it is desired to operate the receivers or carriers by hand said lever being rigidly secured to the shaft H'. It will be seen that the receivers or carriers H approach at their rear ends thereby enabling the corn shocks to be deposited close together.

The reel shaft I is journaled at its ends in standards J which are attached to and suitably braced from the frames C C². The bars K carried by the reel arms are angular or deflected at points corresponding with the inner edges of the pairs of rotary cutters so as to pass over the corn and draw the same into the cutters and onto the receivers or carriers H. These bars K are of metal or wood jointed together to assume and retain the desired shape. The reel shaft is operated from the axle by a belt L which passes over suitable pulleys on the said axle and reel shaft.

The horses are attached to the middle frame C' in tandem to walk between the rows to be cut.

The operation of the machine is obvious from the foregoing detailed description. Hence a further statement of the *modus operandi* of the machine is deemed unnecessary.

Having thus described my invention, what I claim, and desire to secure by Letters Patent, is—

In a corn harvester, the combination of the axle A, having the wheels B, B, mounted thereon and provided with ratchet or clutch mechanism, a series of frames C, C', C² located upon the axle and connected at their rear ends by a beam C³, and bars C⁴, a shaft D, mounted in the forward ends of the frames, the pinions $d$, upon said shaft, the gear wheels E, keyed upon the axle, the bevel gear wheels F, secured upon the shafts D, the tilting receivers or carriers H, located immediately in the rear of each pair of cutters, said receivers being trough shaped and slightly tapering in length and approaching each other at their rear ends, said receivers being rigidly secured to a shaft H', which forms the axis of the receivers and upon which they turn, the lever $h'$, rigidly secured to said shaft and adapted to operate the receivers, and strap $h$, connecting their forward ends, substantially as shown and described.

In testimony whereof I affix my signature in presence of two witnesses.

JOHN JESSE OSBURN.

Witnesses:
C. M. OSBURN,
M. O. BOYD.